(12) United States Patent
Pan et al.

(10) Patent No.: US 10,192,311 B2
(45) Date of Patent: Jan. 29, 2019

(54) METHODS AND APPARATUS FOR CODEWORD BOUNDARY DETECTION FOR GENERATING DEPTH MAPS

(71) Applicant: QUALCOMM Incorporated, San Diego, CA (US)

(72) Inventors: Yunke Pan, San Diego, CA (US); Stephen Michael Verrall, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 266 days.

(21) Appl. No.: 15/230,211

(22) Filed: Aug. 5, 2016

(65) Prior Publication Data

US 2018/0040130 A1 Feb. 8, 2018

(51) Int. Cl.
*G06T 7/521* (2017.01)
*G06T 7/00* (2017.01)

(52) U.S. Cl.
CPC .......... *G06T 7/0057* (2013.01); *G06T 7/0081* (2013.01); *G06T 7/0085* (2013.01); *G06T 7/521* (2017.01)

(58) Field of Classification Search
CPC .... G06T 7/0057; G06T 7/0085; G06T 7/0081
See application file for complete search history.

(56) References Cited

U.S. PATENT DOCUMENTS

| | | |
|---|---|---|
| 5,986,745 A | 11/1999 | Hermary et al. |
| 7,440,590 B1 | 10/2008 | Hassebrook et al. |
| 9,325,973 B1 * | 4/2016 | Hazeghi ............. G01B 11/2513 |
| 2006/0210145 A1 * | 9/2006 | Lee .................... G01B 11/2513 382/154 |
| 2011/0066917 A1 * | 3/2011 | Heinrich ............ H03M 13/1117 714/752 |
| 2012/0294510 A1 * | 11/2012 | Zhang ................. G06K 9/2036 382/154 |
| 2014/0003740 A1 * | 1/2014 | Bone .................... G01B 11/002 382/291 |
| 2014/0307057 A1 * | 10/2014 | Kang ....................... H04N 5/33 348/47 |
| 2014/0347676 A1 * | 11/2014 | Velten ................ G01B 11/2513 356/614 |
| 2015/0187082 A1 | 7/2015 | Bernal et al. |

(Continued)

OTHER PUBLICATIONS

International Search Report and Written Opinion—PCT/US2017/033821—ISA/EPO—dated Aug. 1, 2018.

(Continued)

*Primary Examiner* — Neil R Mikeska
(74) *Attorney, Agent, or Firm* — Paradice and Li LLP

(57) ABSTRACT

A structured light active sensing systems may be configured to transmit and received codewords to generate a depth map by analyzing disparities between the locations of the transmitted and received codewords. To determine the locations of received codewords, an image of the projected codewords is identified, from which one or more codeword boundaries are detected. The codeword boundaries may be detected based upon a particular codeword bit of each codeword. Each detected codeword boundary may be constrained from overlapping with other detected codeword boundaries, such that no pixel of the received image is associated with more than one codeword boundary.

30 Claims, 7 Drawing Sheets

(56) References Cited

U.S. PATENT DOCUMENTS

| | | | | |
|---|---|---|---|---|
| 2015/0204662 A1* | 7/2015 | Kobayashi | .......... | G01B 11/2513 356/610 |
| 2015/0253123 A1 | 9/2015 | Braker et al. | | |
| 2015/0371393 A1 | 12/2015 | Ramachandra et al. | | |
| 2015/0371394 A1* | 12/2015 | Visentini | ............ | H04N 13/0048 382/154 |
| 2015/0381965 A1* | 12/2015 | Atanassov | .......... | H04N 5/23245 348/47 |
| 2016/0050401 A1* | 2/2016 | Gordon | .................... | G01C 3/02 348/744 |
| 2016/0178355 A1* | 6/2016 | Ge | .......................... | G01B 11/22 348/136 |
| 2016/0189387 A1* | 6/2016 | Kannan | .............. | G01B 11/2545 382/106 |
| 2016/0227193 A1* | 8/2016 | Osterwood | .............. | G01S 17/42 |
| 2016/0283549 A1* | 9/2016 | Hux | .................... | G06F 9/30021 |
| 2018/0068456 A1* | 3/2018 | Nash | ...................... | G06T 7/521 |

OTHER PUBLICATIONS

Morano R.A., et al., "Structured Light Using Pseudorandom Codes", IEEE Transactions on Pattern Analysis and Machine Intelligence, Mar. 1998, vol. 20, No. 3, pp. 322-327.

Pages J., et al., "Overview of Coded Light Projection Techniques for Automatic 3D Profiling", IEEE International Conference on Robotics and Automation, Sep. 14-19, 2003, vol. 1, XP010667620, DOI: 10.1109/ROBOT.2003.1241585, ISBN: 978-0-7803-7736-3, pp. 133-138.

Rittler T., et al., "Structured-Light-based Depth Reconstruction Using Low-Light Pico Projector", Advances in Mobile Computing and Multimedia, ACM, Dec. 11, 2015, XP058078974, DOI: 10.1145/2837126.2837154, ISBN: 978-1-4503-3493-8, pp. 334-337.

* cited by examiner

METHODS AND APPARATUS FOR CODEWORD BOUNDARY DETECTION FOR GENERATING DEPTH MAPS

FIELD

This disclosure generally relates to systems and methods for light field projection, and more particularly to depth map generation.

BACKGROUND

Structured light systems may transmit and receive light patterns, or spatial codes, to generate a depth map. The farther away an object is from the transmitter and receiver, the smaller the disparity between the light pattern reflected by object and its original location will be, as the outgoing projection and incoming projection are more parallel. Conversely, the closer an object is to the transmitter and receiver, the bigger the disparity between received light pattern and its original position will be. Thus, the difference between received and transmitted light pattern (codeword) position gives the depth of the scene or object. Structured light systems use these relative depths to generate a depth map or a three dimensional representation of a scene. Depth map extraction is critical to many applications ranging from camera quality enhancement to computer vision.

Generating depth maps may be very computationally expensive, and computation time remains a major obstacle for commercialization of structured light systems for generating depth maps. As such, there exists a need for faster generation of depth maps.

SUMMARY

The systems, methods and devices of this disclosure each have several innovative aspects, no single one of which is solely responsible for the desirable attributes disclosed herein.

In some embodiments, a method operable by an image processing device for generating a depth map is provided. The method may comprise receiving an image, the image corresponding to a light field projected through a mask onto a scene, wherein the received image corresponds to one or more codewords, each codeword comprising one or more codeword bits, each codeword bit comprising one or more pixels. The method may further comprise detecting one or more codeword boundaries, each codeword boundary corresponding to a particular codeword bit of a codeword, wherein each detected codeword boundary is constrained from overlapping with other detected codeword boundaries, such that no pixel of the image is associated with more than one codeword boundary. The method may further comprise identifying one or more codewords corresponding to the one or more detected codeword boundaries; utilizing at least one disparity value between (i) a location on the image of an identified codeword of the one or more identified codewords and (ii) a location associated with the identified codeword on the projected light field to generate a disparity map; and generating a depth map based on the disparity map.

In some embodiments, an image processing device for generating a depth map is provided. The image processing device may comprise a receiver configured to receive an image, the image corresponding to a light field projected through a mask onto a scene, wherein the received image corresponds to one or more codewords, each codeword comprising one or more codeword bits, each codeword bit comprising one or more pixels. The image processing device may further comprise at least one processor, and a memory having stored thereon instructions that, when executed, cause the at least one processor to using the received image, detect one or more codeword boundaries, each codeword boundary corresponding to a particular codeword bit of a codeword, wherein each detected codeword boundary is constrained from overlapping with other detected codeword boundaries, such that no pixel of the image is associated with more than one codeword boundary. The memory may further have stored thereon instructions that, when executed, cause the processor to identify one or more codewords corresponding to the one or more detected codeword boundaries, utilize at least one disparity value between (i) a location on the image of an identified codeword of the one or more identified codewords and (ii) a location associated with the identified codeword on the projected light field to generate a disparity map, and generate a depth map based on the disparity map.

BRIEF DESCRIPTION OF THE DRAWINGS

Various features, nature and advantages may become apparent from the detailed description set forth below when taken in conjunction with the drawings in which like reference characters identify correspondingly throughout.

DETAILED DESCRIPTION

In general, the present disclosure relates to techniques for light field projection and analysis. More specifically, this disclosure relates to systems and methods for constructing depth maps based upon a projected light field.

In accordance with one or more aspects of the present disclosure, structured light active sensing systems may be configured to transmit and receive spatial codes (also referred to as codewords) to generate a depth map. Depth map generation of a scene or an object may be important to many applications, including, for example, camera quality enhancement, computer vision, obstacle detection and avoidance, etc.

Figure 1:
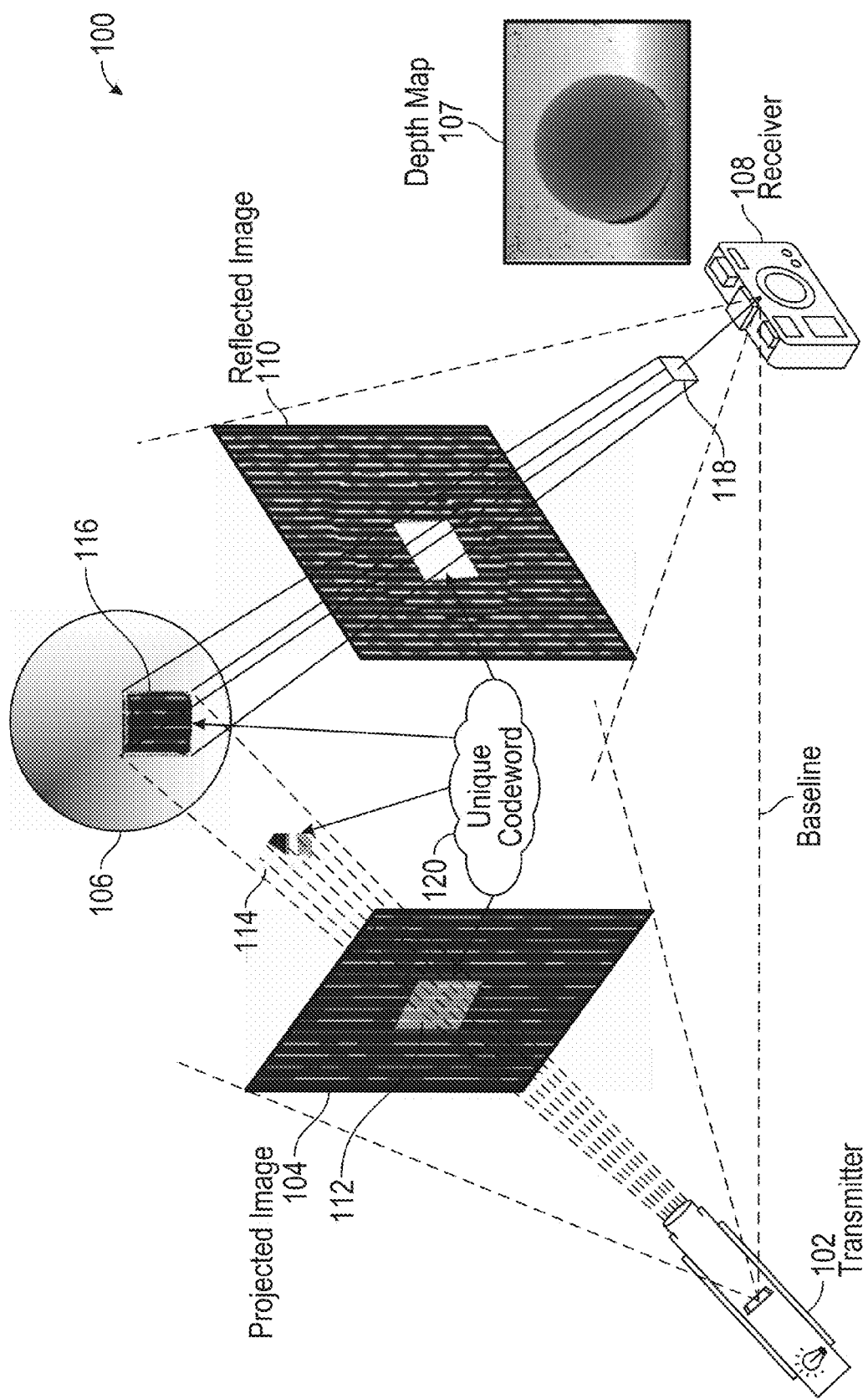
FIG. 1 illustrates an example of a sensing system where a known pattern is used to illuminate a scene and obtain depth information with which to generate 3-dimensional information.

FIG. 1 illustrates an example of an active sensing system 100 where a known pattern is used to illuminate a scene and obtain depth information with which to generate 3-dimensional ("3D") information from 2-dimensional (2D") images and/or information. One or more aspects and/or features described herein may be implemented within such exemplary active sensing system 100. The system illustrated in FIG. 1 includes a transmitter 102 and a receiver 108. The transmitter 102 projects a light field through a code mask to project an image 104 of codewords on an object or scene 106. Herein, for clarity of description, "scene" may be used to refer to either or both a scene and an object depending on the context used. For example, a scene may include a single object of interest, or a plurality of objects of interest. A receiver 108 captures the reflected image 110 and codewords therein. This example illustrates how a section 112 of the code mask is projected (as section 114) onto the surface (e.g., projected section 116) of the scene 106. The projected section 116 may then be captured by the receiver 108 as a captured segment 118. The section 112 may be used as a codeword 120 that can be uniquely identified. Thus, by covering the scene 106 with unique codewords in this manner, sections/portions of the scene 106 may be identified by reflected codewords and this information may be used for sensing the distance (depth) from the sensing device to objects in the scene.

From the image captured by the receiver 108, multiple segments may be identified that were projected over the scene 106. Each captured segment 118 may be uniquely identifiable at the receiver 108 and its location relative to other segments ascertained from the known pattern of the projected image 104. The identification of a code from each segment/portion/window may involve codeword boundary search and decoding of the perceived segment/portion/window into a corresponding codeword(s). In some embodiments, codeword boundary search may involve the application of overlap or sliding window techniques. In this manner, a depth map 107 may be generated for the scene 106.

In some embodiments, as the distance between the transmitter 102/receiver 108 and the object in scene 106 increases transmitted rays of projected codewords from the transmitter 102 to the object in scene 106 are more parallel to received (incoming) codewords reflected off of the surface of the object illuminated by the transmitted rays. Accordingly, codewords reflected from the object in scene 106 and received by a receiver 108 are closer to their original position (in the projected code image) when the object is farther away. Conversely, the closer the object in scene 106 is to the transmitter 102 and receiver 108, the farther the received codewords are from the original position of the codewords (in the projected code image) when they were transmitted. The difference between received and transmitted codeword positions can be used to determine one or more depths of a scene or an object. Structured light active sensing systems may use such depth information to generate a depth map 107 or a three dimensional representation of a scene.

The concepts of this disclosure may be integrated in or be a part of a system (e.g., system 100 as illustrated in FIG. 1) that includes several elements and/or modes aimed at projecting light fields, receiving projected light fields, identifying projected codewords from the received light field, and generating a depth map based upon the locations of the projected codewords. The system 100 may include a memory configured to store image/video information relating to the image. The system 100 may include at least one processor (e.g., part of an integrated circuit (IC) and/or graphics processing unit (GPU)) coupled to the memory and configured to: receive a projected image, detect codeword boundaries within the received image, identify codewords based upon the detected codeword boundaries, generate a disparity map based upon the identified codewords, and generate a depth map based upon the disparity map.

Figure 2:
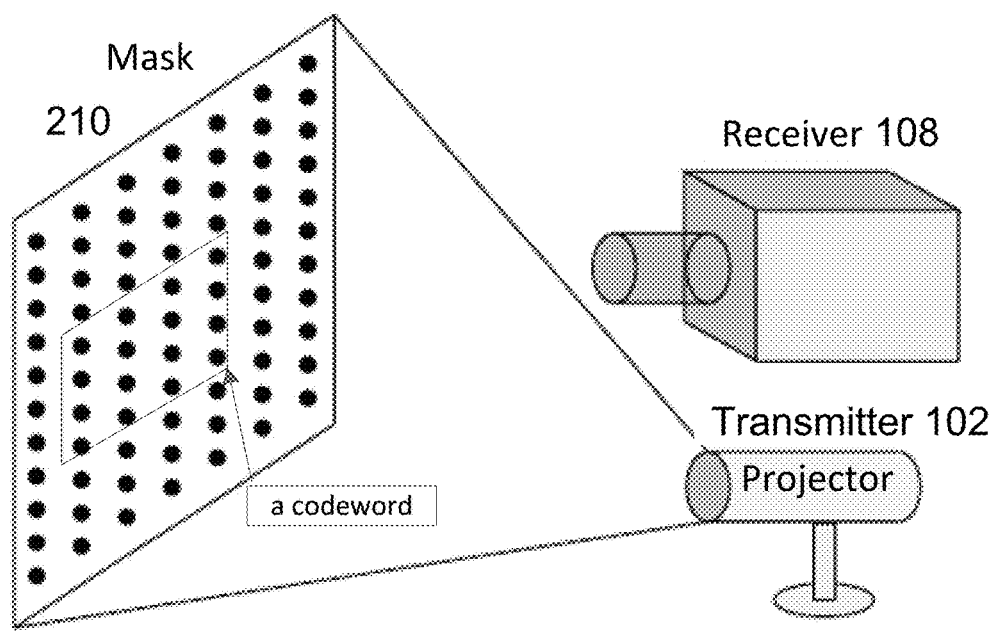
FIG. 2 illustrates an example depth map generation system in accordance with some embodiments.

FIG. 2 illustrates a diagram of a depth map generation system in accordance with some embodiments. The transmitter 102 may project a laser or light field towards a code mask 210. In some embodiments, the projected filed may comprise an infrared laser field. The code mask 210 may comprise a point matrix pattern comprising an array of dots, each dot corresponding to a 0 (light blocked) or a 1 (light-pass through). The dots may be organized into codewords, each codeword comprising an array of projected dots (e.g., a 4 by 4 array). In some embodiments, each codeword dot may also be referred to as a "codeword bit." As used herein, a codeword dot may refer to symbol projected through the codemask by a transmitter (e.g., transmitter 102) corresponding to a 1 or 0, while a codeword bit may refer to a codeword dot as detected by a receiver (e.g., receiver 108). In some embodiments, the receiver may scale a received image such that each detected codeword dot corresponds to a codeword bit associated with a particular number of pixels (e.g., an array of 4 by 4 pixels).

In some embodiments, the code mask 210 may comprise a DOE (diffractive optical element) configured to diffract a laser or light field projected by the transmitter 102 to project a plurality of codewords onto a scene. The receiver 108 may comprise a camera configured to receive the infrared image projected by the transmitter 102 through the code mask 210 onto a scene.

Transmitter Device Operation

Figure 3:
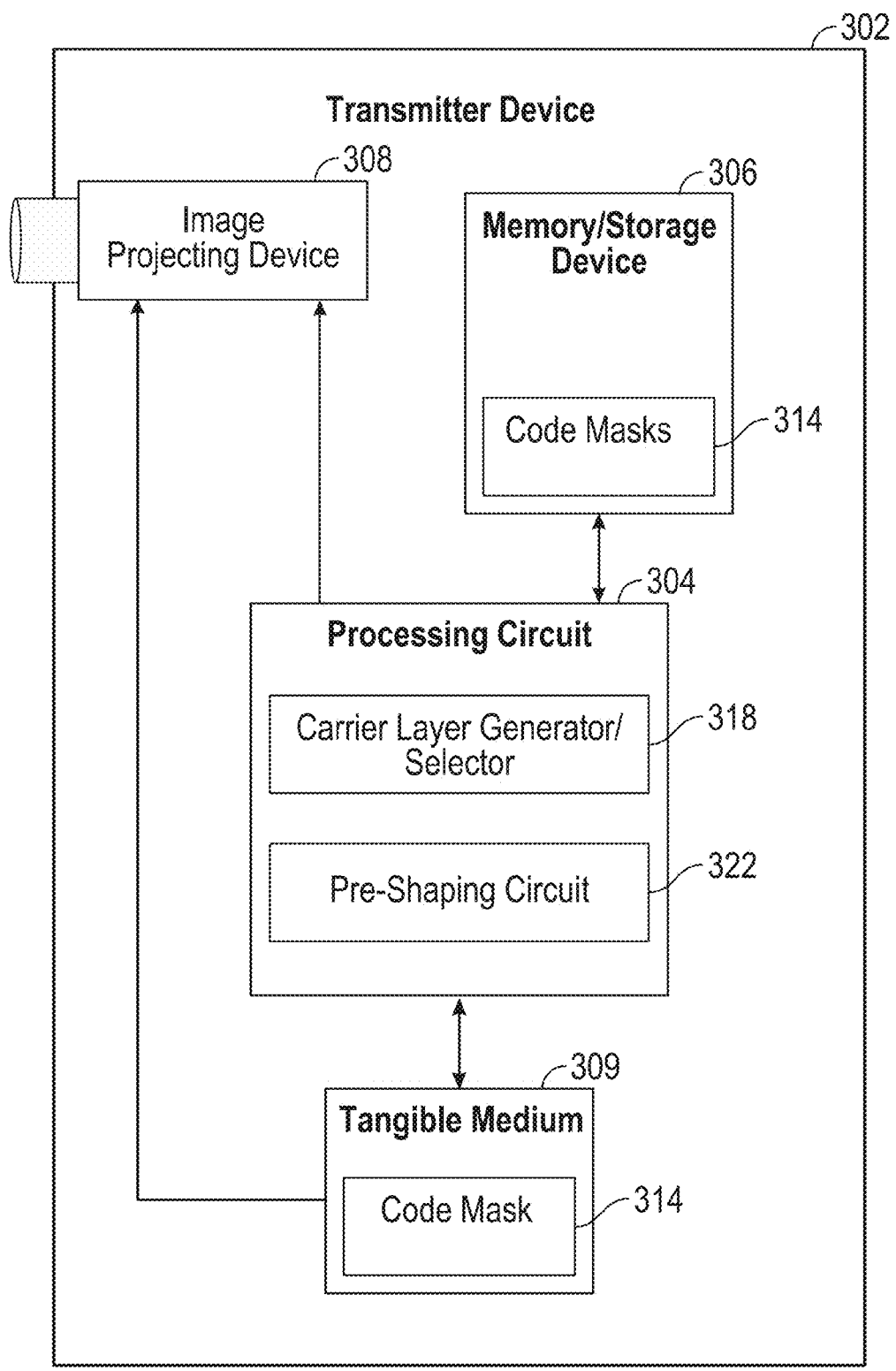
FIG. 3 illustrates a block diagram of an example transmitter device that may be configured to generate and/or project a code mask.

FIG. 3 is a block diagram illustrating an example of a transmitter device that may be configured to generate a code mask (e.g., a pattern of structured light) and/or project the code mask. The transmitter device 302 may include a processing circuit 304 (or processor) coupled to a memory/storage device 306, an image projecting device 308, and/or a tangible medium 309.

In a first example, the transmitter device 302 may be coupled to include a tangible medium 309. The tangible medium may define, include, and/or store a code mask 314. In some embodiments, the code mask 314 may be implemented in hardware as a pre-defined mask, such as a DOE (diffractive optical element).

In some embodiments, the transmitter 302 may be configured to project a code mask generated in software. For example, the processing circuit 304 may include a code mask generator/selector 320 and/or a pre-shaping circuit 322. The code mask generator/selector may select a pre-stored composite code mask 314 from a memory/storage device 306. Optionally, the processing circuit 304 may include a pre-shaping circuit configured to pre-shape the selected code mask (e.g., code mask 314) to compensate for expected distortion in the channel through which the composite code mask is to be projected. [0033] In some implementations, a plurality of different code layers and/or carrier layers may be available, where each such carrier or code layers may be configured for different conditions (e.g., for objects at different distances, or different configurations between the transmitter device and receiver device).

The image projecting device 308 may serve to project the generated/selected composite code mask onto an object of interest. For instance, a laser or other light source may be used to project the composite code mask onto the object of interest (e.g., through a projection channel). In one example, the code mask 314 may be projected in an infrared spectrum, so it may not be visible to the naked eye. Instead, a receiver sensor in the infrared spectrum range may be used to capture such projected composite code mask.

Receiver Device Operation

Figure 4:
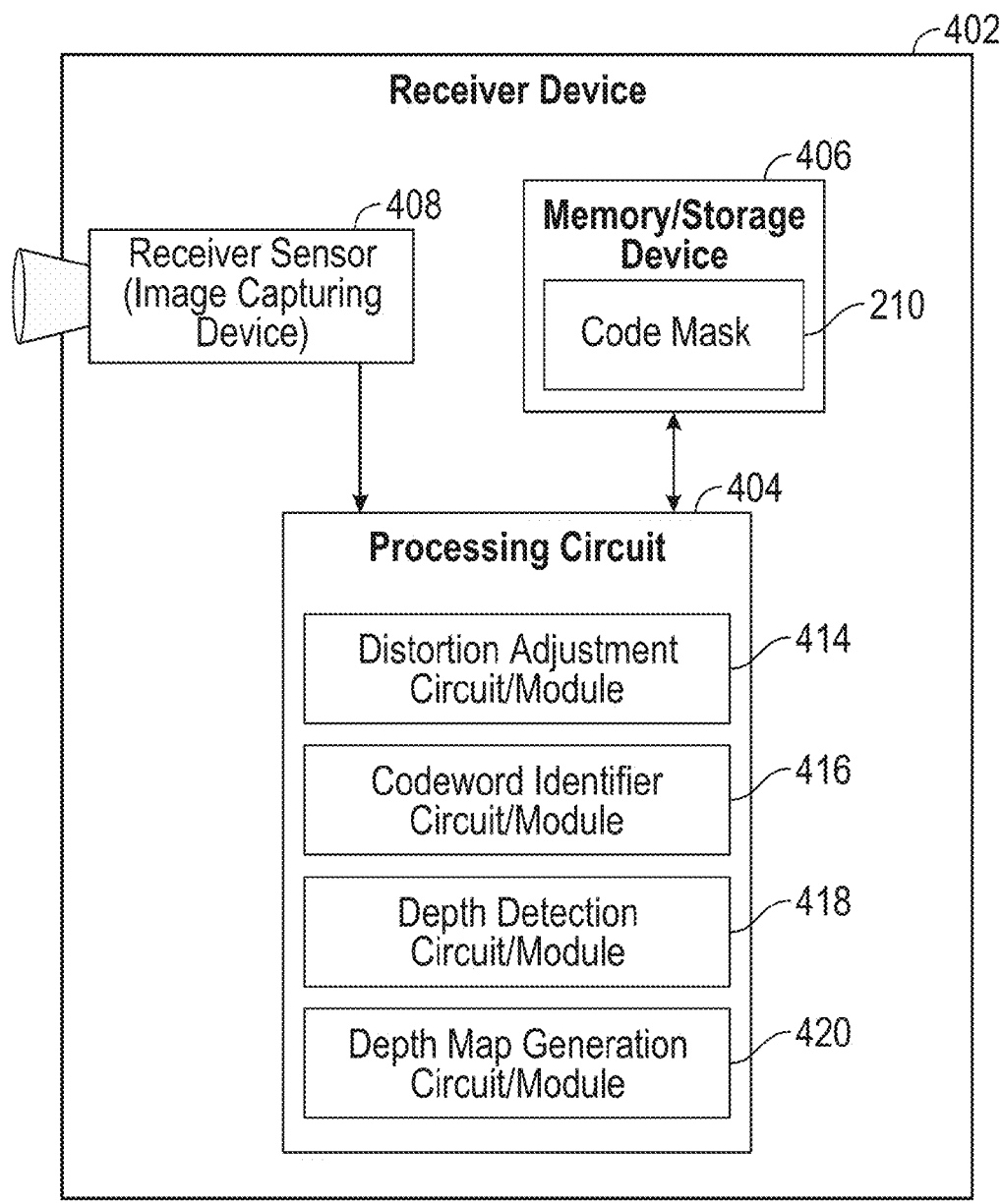
FIG. 4 illustrates a block diagram of an example receiver device that may be configured to obtain depth information from a composite code mask.

FIG. 4 is a block diagram illustrating an example of a receiver device 402 that is configured to receive a code mask reflected from an object and to determine be depth information from the received code mask. The receiver device 402 may include a processing circuit 404 coupled to a memory/storage device 406 and a receiver sensor 408 (e.g., an image capturing device). In some embodiments, the receiver sensor 408 is an image capture device, for example, a camera.

The receiver sensor 408 may be configured to obtain at least a portion of a code mask projected on the surface of an object. For instance, the receiver sensor may capture an image of at least a portion of a code mask projected on the surface of a target object. The code mask is defined by uniquely identifiable spatially-coded codewords defined by a plurality of symbols. In one example, the receiver sensor 408 may capture the code mask in the infrared spectrum.

Still referring to FIG. 4, in some embodiments, the code layer may comprise n1 by n2 binary symbols, where n1 and n2 are integers greater than two. In some embodiments, without considering diffraction, each binary symbol may correspond to a dot on mask. A transparent dot will generate binary 1, while an opaque dot will generate a binary 0. Depending on the distance between projector and mask, and the focus length of receiver, the light from one mask dot and reflected by object may generate multiple pixels in 2 dimensions on a received image. In some embodiments, the received image may be scaled to a proper size, such that a mask dot will be represented by an array of 4×4 pixels.

In some embodiments, a determination is made as to which pixel in a given 4×4 array will be the best to represent a dot on the mask. First, a distortion adjustment may be applied on received image to compensate for the receiver's physical limitations (e.g., using a distortion adjustment circuit/module 414). In some embodiments, the image passes through an image enhancement system. In the case that 4×4 pixel array represents a binary 1, the image enhancement system will make the most intensive pixel in the array brighter. In other words, the distortion adjustment and image enhancement system may make the codeword boundary easier to be detected by just searching for the maximum intensity pixel. Once a code boundary is detected, the codeword can be formed.

The codeword identifier circuit/module 416 may be configured to obtain a codeword from a window defined within the portion of the code mask. The depth detection circuit/module 418 may be configured to receive image data (e.g., adjusted image data from the distortion adjustment circuit/module 414) and detected codewords by the codeword identifier circuit/module 416 to obtain depth information for a surface portion of the target object corresponding to the window based on: (a) a single projection of the code mask, and (b) a displacement of the window relative to a known reference code mask. The depth map generation circuit/module 420 may be configured to assemble a depth map for the object based on a plurality of codewords detected as different overlapping windows within the portion of the undistorted code mask.

Additional examples of structured light systems are disclosed in U.S. Patent Pub. No. 2015/0371393, titled "Structured Light Three-Dimensional (3D) Depth Map Based on Content Filtering," filed on Jun. 18, 2015, the contents of which are hereby incorporated by reference in their entirety.

Depth Map Generation Process

Figure 5:
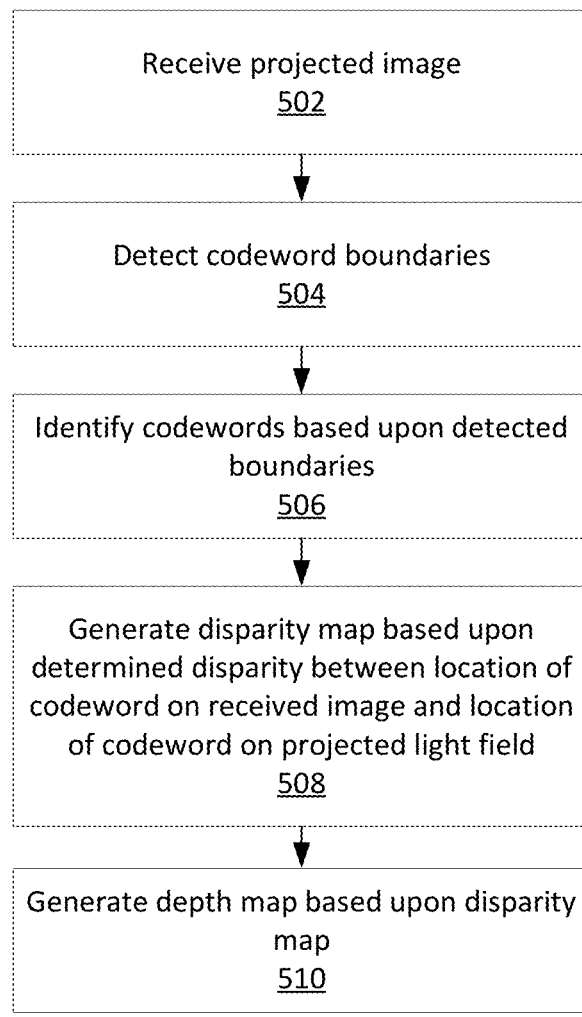
FIG. 5 illustrates a flowchart of a process for generating a depth map using projected codewords, in accordance with some embodiments.

FIG. 5 illustrates a flowchart of a process for generating a depth map using projected codewords, in accordance with some embodiments. At block 502, an image is received at the receiver device (e.g., receiver 108 as illustrated in FIG. 1). The image may have been the result of projecting a light field onto a scene through a code mask using a projector device, the projected lightfield comprising one or more codewords. In some embodiments, the projected lightfield may comprise an array of dots, each dot corresponding to a codeword bit comprising one or more pixels (e.g., a 4 by 4 array of pixels). For example, as described above, some dots on the code mask are transparent, while others may be opaque. Light passing through a dot is reflected by an object in the scene.

On the receiver side, light from the reflected dots will form a 2-dimensional array represented by pixels of an image. In some embodiments, the received image may undergo one or more pre-processing steps. For example, the image may be scaled to a certain size (e.g., such that the light from a dot on the mask corresponds to a 4 by 4 pixel array on the scaled image). In some embodiments, the image may be enhanced by passing the image through a low-pass filter and a high-pass filter to produce an enhanced image.

In order to determine the location of projected codewords and construct a depth map, the boundaries of the codewords are detected at block 504. As discussed above, in some embodiments, each mask dot corresponds to a codeword bit which, on the scaled image, corresponds to an array of 4 by 4 pixels. In some embodiments, each codeword comprises 16 codeword bits. As such, a codeword may correspond to 16×16 pixels. In some embodiments, detecting codeword boundaries may comprise determining a starting pixel for each codeword bit of a codeword (e.g., a pixel at the top left corner of a codeword bit) or a pixel that best represents a codeword bit of a codeword. In some embodiments, identified codeword boundaries may be stored using a codeword boundary array. The codeword boundary array may be configured based upon a received image size, wherein each entry of the array indicates whether a corresponding pixel is a codeword boundary (e.g., 1 if the pixel is a codeword boundary, 0 if the pixel is not a codeword boundary).

At block 506, one or more codewords are identified based upon the identified codeword boundaries. For example, in some embodiments, values of the bits of a codeword defined by each of the identified codeword boundaries are determined. The codewords may then be matched with a known codewords projected by the transmitter (e.g., transmitter 102). In some embodiments, matching the identified codewords with known projected codewords may be performed using a lookup table.

At block 508, the identified codewords are used to generate a disparity map indicating a spatial difference between the projected location of the codeword and the detected received location of the codeword, based upon determined disparity values between (i) locations on the received image of the identified codewords, and (ii) locations associated with the identified codewords on the projected light field. For example, in some embodiments, a lookup table (e.g., associated with codeword identifier circuit/module 416) is accessed in order to determine the projected location of the codeword in order to calculate its disparity. In some embodiments, additional post-processing may be performed to fill in any holes present in the disparity map. At block 510, the disparity map may be used to generate a depth map of the scene (e.g., using depth detection circuit/module 418 and/or depth map generation circuit/module 420).

The computation required to generate the depth map can be very intensive and require a large amount of processing time. In many applications, it may be important to be able to generate depth maps quickly. For example, a structured light system may be mounted on a car or other vehicle (e.g., an automated drone) in order to produce a depth map of objects in front of the vehicle for measuring obstacle distance. In order to be usable, the computation time for generating the depth map must be fast enough that the vehicle will be able to avoid the obstacle after the depth map has been generated. As such, there exists a need to reduce the computation required to generate a depth map, in order to increase the speed at which a depth map can be generated.

Codeword Boundary Detection

As discussed above, a depth map may be generated by projecting a laser or light field matrix through a code mask to create a dot pattern of zeros and ones organized into a plurality of codewords. For example, in some embodiments, a dot corresponds to a one if the laser can pass through the mask, and zero if the laser is blocked from passing through the mask. In other embodiments, the code mask may be projected using diffraction.

In some embodiments, each bit of a codeword corresponds to an array of pixels. For example, as discussed above, each bit may correspond to a 4 by 4 array of pixels. A codeword may comprise an array of bits. For example, in some embodiments, a codeword may comprise a 4 by 4 array of bits, for a total of 16 bits, thus corresponding to a 16 by 16 array of pixels. The projected codewords are detected and identified, and a shift between the detected location of the codeword and a projected location of the codeword on the mask can be calculated and used to determine a depth. In some embodiments, prior to detecting codewords, the received image may be scaled (e.g., based on the FOVs of the transmitter and receiver, the resolution of the receiver, and/or the like) such that each codeword corresponds to the correct number of pixels (e.g., 16 by 16 pixels).

In order to determine the location of projected codewords, the boundaries of the codewords need to be detected. In some embodiments, detected codeword boundaries may be stored using a codeword boundary array. For example, the codeword boundary array may configured based upon a received image size, wherein each entry of the array indicates whether a corresponding pixel of the image is associated with a codeword boundary (e.g., 1 if the pixel is a codeword boundary, 0 if the pixel is not a codeword boundary).

The locations of codewords may shift in a location when projected onto a scene. As such, it may be unknown to which codeword a particular pixel belongs to. In addition, in some embodiments, a particular detected pixel may comprise an overlap between two or more projected pixels. In some embodiments, in order to increase the chance that codeword boundaries are detected correctly, codeword boundaries may be detected in an overlapped fashion. For example, in some embodiments, a particular pixel region may contain more than one codeword boundary. This may occur when a slanted edge of an object in the scene causes a discontinuity of the received pattern with respect to the projected pattern, resulting in one codeword overlaying another codeword.

Figures 6A, 6B:
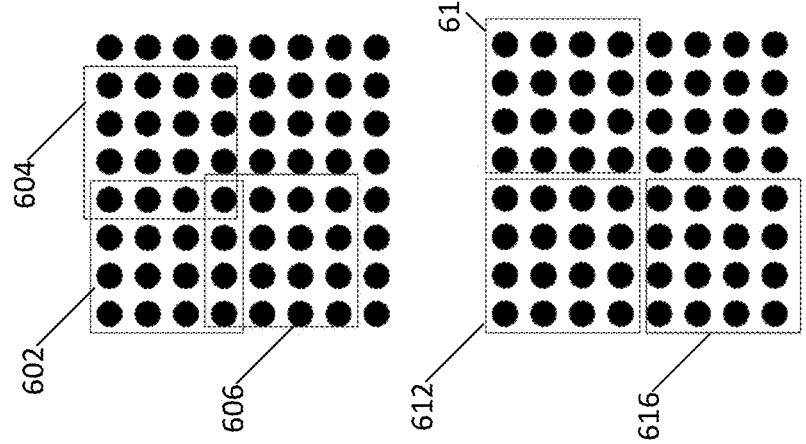
FIG. 6A illustrates a codeword boundary detection scheme where boundaries for codewords may be identified as overlapping.
FIG. 6B illustrates a codeword boundary detection scheme implementing a constraint that no codeword boundaries overlap.

FIG. 6A illustrates a codeword boundary detection scheme where boundaries for codewords (each corresponding to 16 pixels in a scaled version of the received image) may be identified as overlapping by one row or one column of pixels. As illustrated in FIG. 6A, a boundary for a particular codeword may be defined as a pixel of a particular codeword bit of the codeword (e.g., a top left codeword bit of the codeword) spanning an array of 4 by 4 pixels. For example, FIG. 6A illustrates a first detected codeword boundary in box 602 (representing a codeword bit, in which a particular pixel within box 602 corresponds to the codeword boundary), a second detected codeword boundary in box 604, and a third detected codeword boundary in box 606, wherein box 602 overlaps with box 604 by one column of pixels, and overlaps with box 606 by one row of pixels. In some embodiments, in a full overlap case (next box advancing by one pixel in horizontal or vertical direction), for each array of pixels (e.g., 4 by 4 array), any one of the 16 pixels of the array may be a candidate for a codeword boundary. Each of the boundaries may be used to detect and process a codeword associated with the boundary (e.g., determine the pixel values of the codeword associated with the boundary, identify the codeword as a projected codeword, calculate the disparity for the codeword, etc.).

Non-Overlapping Codeword Boundary Detection

In some embodiments, in order to reduce the amount of processing required when determining codeword boundaries, a constraint preventing detected codeword boundaries from overlapping may be imposed. When the received image is constrained such that codeword boundaries do not overlap, each array of pixels corresponding to a size of a codeword bit (e.g., 4 by 4 array) will only be associated with one boundary.

FIG. 6B illustrates a codeword boundary detection scheme implementing a constraint that no codeword boundaries overlap. For example, box 612 may correspond to a bit (e.g., top left bit) of a first detected codeword, which may be adjacent to box 614 corresponding to a bit of a second detected codeword, and box 616 corresponding to a bit of a third detected codeword, but without any overlap of their respective codeword bits. As such, only one pixel is claimed as a codeword boundary in a given 4×4 pixel array.

Therefore, by implementing the constraint that detected codeword boundaries (e.g., defined by a particular codeword bit of the codeword) cannot overlap, codeword boundaries may be detected more efficiently, and the codeword boundary array may be reduced in size (e.g., requiring only one pixel per 4×4 pixel array to be detected as a boundary, with the remaining 15 pixels inferred to not be boundaries). In addition, because the number of codewords detected is reduced, the amount of subsequent processing required (e.g., identifying codewords, determining disparity, and/or the like) may be reduced, potentially reducing the processing time required to generate a depth map.

In some embodiments, non-overlapping codeword boundary detection may be used to reduce the complexity of detecting and identifying codewords, without compromising quality. For example, each 4×4 pixel array generally corresponds to a very small area on an object. The area may be small enough that it can be considered as a flat plane having the same depth. When codewords are reflected by a flat area, the codewords are evenly spread out in the received image, such that the distance of each bit in codeword (e.g., 4×4 pixels) is the same. Thus, it can be assumed that there is only one codeword boundary in every 4×4 pixel array. In some embodiments, the codeword boundary location in a current 4×4 pixel array may be different from a next 4×4 pixel array, due to the two points on the object reflecting the 2 arrays at different depths.

In some embodiments, the depth map resolution is 1/16 of scaled image size (downscaled by 4 on both vertical and horizontal directions), which mean for every 4×4 pixel array, only one depth value is generated. Because this mechanism assumes that each pixel in a given 4×4 pixel array represents the same depth, non-overlapping codeword boundary detection can be implemented for each 4×4 pixel array.

Codeword Thresholds and Pixel Sorting

Once the boundaries of a codeword have been identified, the value of the codeword needs to be determined. As discussed above, a codeword may comprise an array of bits (e.g., a 4×4 array of bits, each bit corresponding to a dot on the projected code mask and comprising an array of pixels on the received image), wherein each bit may correspond to a value of 0 (light blocked) or 1 (light pass-through).

In order to determine the value of a detected codeword, it is necessary to determine which bits of the detected codeword have a value of 0, and which have a value of 1. As discussed above, each bit may correspond to a plurality of pixels. For example, in some embodiments each bit may correspond to a 4 by 4 array of pixels, for a total of 16 pixels per bit. The pixels associated which each bit may all be configured to have the same value (e.g., all 0 or all 1). In some embodiments, only a particular pixel with a bit (e.g., a top-left pixel) may have a high value (if the bit corresponds to a value of 1), wherein the codeword bit is identified by detecting a highest intensity pixel within a 4×4 pixel region. However, the detected intensities of the pixels may be different from the projected values, due to the light reflecting from different objects and materials. For example, pixels detected at the receiver device may have a range of intensity values (e.g., a value between 0 and 255).

In some embodiments, to determine the values of the bits of a detected codeword, a threshold value is identified, wherein bits with pixels having an intensity value (e.g., an average intensity value) above the threshold are considered to have a value of 1, while bits with pixels having an intensity value below the threshold are considered to have a value of 0. Because different projected codewords may be reflected in different ways (e.g., on different objects or at different angles), different threshold values may be identified for different codewords. For example, in some embodiments, each codeword may be associated with its own threshold value. In other embodiments, groups of codewords may share a threshold value.

The threshold value for a codeword may be determined based at least in part upon a detected value of a particular pixel of the codeword. In some embodiments, a pixel may be extracted from each bit of the codeword, and the values of the extracted pixels are compared to determine the threshold value. For example, where a codeword comprises n bits, the threshold value may be determined based upon a value of a pixel of the codeword having the (n/2−1)th highest value out of n extracted pixels (each corresponding to a different bit of the codeword). For example, in an embodiment where a codeword comprise 16 bits, the threshold value is based upon the value of the pixel having the 7$^{th}$ highest value of the 16 extracted pixels (one for each of the 16 bits). In some embodiments, the extracted pixel for a bit of the codeword may be a random pixel associated with the bit. In other embodiments, the extracted pixel may correspond to a pixel at a designated location (e.g., a pixel at the top left corner of the bit, a center pixel of the bit, and/or the like).

Once the threshold value for a codeword is determined, the codeword may be matched with a projected codeword (e.g., using a lookup table) in order to identify the codeword and to determine a disparity between the projected and received locations of the codeword. In some embodiments, an initial threshold value may be determined for a codeword, upon which the codeword may be matched with a projected codeword based on the initial threshold. If an adequate match is found, a disparity can be determined. However, if an adequate match is not found (e.g., the value of the codeword determined using the initial threshold does not match with any of the projected codewords, also referred to as a "false match"), a new threshold may be calculated for the codeword.

In some embodiments, the thresholds may be chosen empirically, based upon one or more statistics of the projected patterns. For example, projected patterns may be analyzed, and a determination made as to the most possible boundary between pixels treated as 0 and pixels treated as 1. In addition, a second and third most possible boundary may be determined. The boundaries may be applied in order, in order to identify the codeword and reduce the number of false matches.

For example, an initial threshold may be calculated as the value of the 7th highest pixel (out of 16 extracted pixels) of the codeword divided by 4, which in some embodiments corresponds to a boundary determined empirically to result in the fewest false matches. Using the initial threshold value, the codeword is attempted to be matched with a projected codeword. If no adequate match is found, a second threshold value may be calculated as the value of the 7th highest pixel divided by 2. If still no match is found using the second threshold value, a third threshold value may be calculated as the value of the 7th highest pixel divided by 6.

In some embodiments, in order to determine a threshold value associated with a codeword, the extracted pixels associated with the codeword are sorted by pixel value (e.g., to identify a 7th highest pixel value in a 16 pixel codeword). However, sorting the pixel values of codewords may be time intensive and require a large amount of computational resources. In some embodiments, in order to reduce the time and resources needed to sort the pixel values of the codewords, vector processing may be used.

Figure 7:
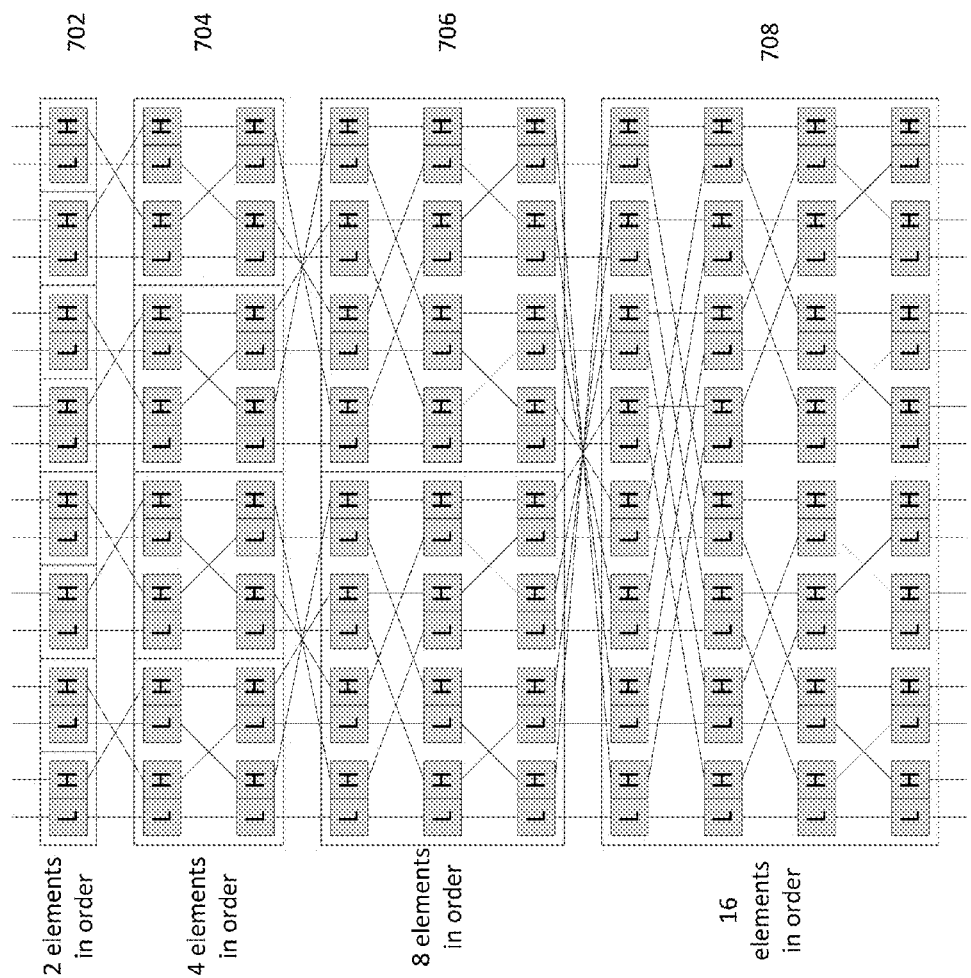
FIG. 7 illustrates an example of performing a bitonic merge sort on a group of 16 pixels.

In some embodiments, the pixel values may be sorted using a bitonic merge sort. As bitonic merge sort requires the number of input to be a power of 2, it may be used in embodiments where each codeword comprises a number of bits that is a power of 2 (e.g., 16 codeword bits). FIG. 7 illustrates an example of performing a bitonic merge sort on a group of 16 pixels. Each block of the bitonic merge sort takes 2 input pixels, and compares them, then output them in the order from Low to High. At 702, the pixels are divided into groups of 2 pixels each, each group being sorted by pixel intensity values. At output of 702, the 2 pixels in each group are sorted. At 704, neighboring 2-pixel groups are combined to form groups of 4 pixels by re-ordering the inputs. The 4 groups are then fed into 2 levels of comparisons by intensity values. At the output of 704, each group of 4 pixels will be ordered. At 706, neighboring 4-pixel groups are combined to form groups of 8 pixels by re-ordering the inputs, the 2 groups then being fed into 3 levels of comparison by intensity value. As a result, at the output of 706, the 8 pixels in each group are ordered. At 708, two 8-pixel groups are combined to form one group of 16 pixels by re-order the inputs, then the group is fed into 4 levels of comparison by intensity value. As a result, at the output of 708, 16 pixels in each group are ordered.

Once the pixels have been sorted, the threshold value for the codeword may be identified by statistics of projected pattern (e.g., based upon the intensity of the 7th pixel of the sorted pixels). In some embodiments, because each codeword may be associated with its own threshold value, a large amount of computation time will be spent on sorts when generating a depth map. As such, by increasing sorting efficiency, significant decreases in computation time may be realized.

Other Considerations

The above detailed description is directed to certain specific embodiments of the invention. However, the invention can be embodied in a multitude of different ways. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

The systems and methods described herein may be implemented on a variety of different computing devices that hosts an active spatial sensing system. These include dedicated imaging systems, mobile phones, tablets, dedicated cameras, wearable computers, personal computers, photo booths or kiosks, personal digital assistants, ultra-mobile personal computers, and mobile internet devices. They may use general purpose or special purpose computing system environments or configurations. Examples of computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described in the figures. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium," "computer-readable medium," and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

A person having ordinary skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method, operable by an image processing device, for generating a depth map, the method comprising:
   receiving an image, the image corresponding to a light field projected through a mask onto a scene, wherein the received image corresponds to one or more codewords, each codeword comprising one or more codeword bits, each codeword bit comprising one or more pixels;
   detecting one or more codeword boundaries, each codeword boundary corresponding to a particular codeword bit of a codeword, wherein each detected codeword boundary is constrained from overlapping with other detected codeword boundaries, such that each pixel of the image is included within an enclosed codeword boundary and no pixel is included within more than one enclosed codeword boundary;
   identifying one or more codewords corresponding to the one or more detected codeword boundaries;
   utilizing at least one disparity value between (i) a location on the image of an identified codeword of the one or more identified codewords and (ii) a location associated with the identified codeword on the projected light field to generate a disparity map; and
   generating a depth map based on the disparity map.

2. The method of claim 1, wherein identifying one or more codewords corresponding to the one or more detected codeword boundaries comprises, for an identified codeword:
   determining a value of each codeword bit of the codeword; and
   associating the codeword with a known codeword projected as part of the projected light field.

3. The method of claim 2, wherein associating the codeword with a known codeword comprises matching the codeword with a known codeword using a lookup table.

4. The method of claim 3, wherein determining a value of each codeword bit of the codeword comprises:
   extracting a pixel from each codeword bit of the codeword;
   sorting the extracted pixels based upon an intensity value of each pixel;
   determining a threshold value based at least in part upon a value of a particular pixel of the sorted pixels; and
   determining a value of each codeword bit of the codeword, based at least in part upon the calculated threshold value.

5. The method of claim 4, wherein the sorting comprises a bitonic merge sort.

6. The method of claim 4, further comprising, in response to determination that the codeword is not associated with a known projected codeword,
   determining a second threshold value based at least in part upon the value of the particular pixel, the second threshold value different from the threshold value;
   determining a value of each codeword bit of the codeword, based at least in part upon the calculated second threshold value.

7. The method of claim 4, wherein the codeword comprises n codeword bits, and wherein the particular pixel corresponds the pixel with the (n/2-1)th highest intensity value of the extracted pixels.

8. The method of claim 7, wherein the codeword comprises 16 codeword bits, each of which comprises 16 pixels.

9. The method of claim 1, wherein the detected codeword boundaries are stored in a codeword boundary array, the codeword boundary array indicating whether each pixel of the image corresponds to a codeword boundary.

10. The method of claim 1, wherein each detected codeword boundaries corresponds to a top left codeword bit of a corresponding codeword.

11. An image processing device for generating a depth map, comprising:
   a receiver configured to receive an image, the image corresponding to a light field projected through a mask onto a scene, wherein the received image corresponds to one or more codewords, each codeword comprising one or more codeword bits, each codeword bit comprising one or more pixels;
   at least one processor; and
   a memory having stored thereon instructions that, when executed, cause the at least one processor to:
      use the received image, detect one or more codeword boundaries, each codeword boundary corresponding to a particular codeword bit of a codeword, wherein each detected codeword boundary is constrained from overlapping with other detected codeword boundaries, such that each pixel of the image is included within an enclosed codeword boundary and no pixel is included within more than one enclosed codeword boundary;
      identify one or more codewords corresponding to the one or more detected codeword boundaries;
      utilize at least one disparity value between (i) a location on the image of an identified codeword of the one or more identified codewords and (ii) a location associated with the identified codeword on the projected light field to generate a disparity map; and
      generate a depth map based on the disparity map.

12. The image processing device of claim 11, wherein the memory further having stored thereon instructions that, when executed, cause the processor to identify one or more codewords corresponding to the one or more detected codeword boundaries by, for an identified codeword:
   determining a value of each codeword bit of the codeword; and
   associating the codeword with a known codeword projected as part of the projected light field.

13. The image processing device of claim 12, wherein the memory further having stored thereon instructions that, when executed, cause the processor to associate the codeword with a known codeword by matching the codeword with a known codeword using a lookup table.

14. The image processing device of claim 13, wherein the memory further having stored thereon instructions that, when executed, cause the processor to determine a value of each codeword bit of the codeword via:
   extracting a pixel from each codeword bit of the codeword;
   sorting the extracted pixels based upon an intensity value of each pixel;
   determining a threshold value based at least in part upon a value of a particular pixel of the sorted pixels; and
   determining a value of each codeword bit of the codeword, based at least in part upon the calculated threshold value.

15. The image processing device of claim 14, wherein the sorting comprises a bitonic merge sort.

16. The image processing device of claim 14, wherein the memory further having stored thereon instructions that, when executed, cause the processor to, in response to determination that the codeword is not associated with a known projected codeword:
   determine a second threshold value based at least in part upon the value of the particular pixel, the second threshold value different from the threshold value;
   determine a value of each codeword bit of the codeword, based at least in part upon the calculated second threshold value.

17. The image processing device of claim 14, wherein the codeword comprises n codeword bits, and wherein the particular pixel corresponds the pixel with the (n/2-1)th highest intensity value of the extracted pixels.

18. The image processing device of claim 17, wherein the codeword comprises 16 codeword bits, each of which comprises 16 pixels.

19. The image processing device of claim 11, wherein the detected codeword boundaries are stored in a codeword boundary array, the codeword boundary array indicating whether each pixel of the image corresponds to a codeword boundary.

20. The image processing device of claim 11, wherein each detected codeword boundaries corresponds to a top left codeword bit of a corresponding codeword.

21. An image processing device for generating a depth map, comprising:
   means for receiving an image, the image corresponding to a light field projected through a mask onto a scene, wherein the received image corresponds to one or more codewords, each codeword comprising one or more codeword bits, each codeword bit comprising one or more pixels;
   means for using the received image to detect one or more codeword boundaries, each codeword boundary corresponding to a particular codeword bit of a codeword, wherein each detected codeword boundary is constrained from overlapping with other detected codeword boundaries, such that each pixel of the image is included within an enclosed codeword boundary and no pixel is included within more than one enclosed codeword boundary;
   means for identifying one or more codewords corresponding to the one or more detected codeword boundaries;
   means for utilizing at least one disparity value between (i) a location on the image of an identified codeword of the one or more identified codewords and (ii) a location associated with the identified codeword on the projected light field to generate a disparity map; and
   means for generating a depth map based on the disparity map.

22. The image processing device of claim 21, further comprising:
   means for determining a value of each codeword bit of the codeword by:
      extracting a pixel from each codeword bit of the codeword;
      sorting the extracted pixels based upon an intensity value of each pixel;
      determining a threshold value based at least in part upon a value of a particular pixel of the sorted pixels; and
      determining a value of each codeword bit of the codeword, based at least in part upon the calculated threshold value; and
   means for associating the codeword with a known codeword projected as part of the projected light field.

23. The image processing device of claim 22, wherein the codeword comprises n codeword bits, and wherein the particular pixel corresponds the pixel with the (n/2-1)th highest intensity value of the extracted pixels.

24. The image processing device of claim 22, wherein the means for determining a value of each codeword bit of the codeword are further configured to:
   determine a second threshold value based at least in part upon the value of the particular pixel, the second threshold value different from the threshold value;
   determine a value of each codeword bit of the codeword, based at least in part upon the calculated second threshold value.

25. The image processing device of claim 22, wherein the sorting comprises a bitonic merge sort.

26. A non-transitory computer-readable medium comprising code that, when executed, causes an apparatus to:
   receive an image, the image corresponding to a light field projected through a mask onto a scene, wherein the received image corresponds to one or more codewords, each codeword comprising one or more codeword bits, each codeword bit comprising one or more pixels;
   use the received image to detect one or more codeword boundaries, each codeword boundary corresponding to a particular codeword bit of a codeword, wherein each detected codeword boundary is constrained from overlapping with other detected codeword boundaries, such that each pixel of the image is included within an enclosed codeword boundary and no pixel is included within more than one enclosed codeword boundary;
   identify one or more codewords corresponding to the one or more detected codeword boundaries;
   utilize at least one disparity value between (i) a location on the image of an identified codeword of the one or more identified codewords and (ii) a location associated with the identified codeword on the projected light field to generate a disparity map; and
   generate a depth map based on the disparity map.

27. The non-transitory computer-readable medium of claim 26, wherein the apparatus is further configured to:
   determine a value of each codeword bit of the codeword by:
      extracting a pixel from each codeword bit of the codeword;
      sorting the extracted pixels based upon an intensity value of each pixel;

determining a threshold value based at least in part upon a value of a particular pixel of the sorted pixels; and determining a value of each codeword bit of the codeword, based at least in part upon the calculated threshold value; and associate the codeword with a known codeword projected as part of the projected light field.

28. The non-transitory computer-readable medium of claim 27, wherein the codeword comprises n codeword bits, and wherein the particular pixel corresponds the pixel with the (n/2-1)th highest intensity value of the extracted pixels.

29. The non-transitory computer-readable medium of claim 27, determining a value of each codeword bit of the codeword further comprises:

determining a second threshold value based at least in part upon the value of the particular pixel, the second threshold value different from the threshold value;

determining a value of each codeword bit of the codeword, based at least in part upon the calculated second threshold value.

30. The non-transitory computer-readable medium of claim 27, wherein the sorting comprises a bitonic merge sort.

* * * * *